United States Patent
Liang

(10) Patent No.: US 8,743,563 B2
(45) Date of Patent: Jun. 3, 2014

(54) ELECTRONIC DEVICE WITH AN APPARATUS FOR FIXING A POWER SUPPLY

(75) Inventor: An-Gang Liang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

(*) Notice: Subject to any disclaimer, the term of this patent is extended or adjusted under 35 U.S.C. 154(b) by 294 days.

(21) Appl. No.: 13/232,983

(22) Filed: Sep. 14, 2011

(65) Prior Publication Data

US 2012/0293975 A1  Nov. 22, 2012

(30) Foreign Application Priority Data

May 18, 2011  (CN) .......................... 2011 1 0129130

(51) Int. Cl.
 *H05K 7/14* (2006.01)
(52) U.S. Cl.
 USPC .......................................................... 361/802
(58) Field of Classification Search
 USPC .......................................................... 361/802
 See application file for complete search history.

(56) References Cited

U.S. PATENT DOCUMENTS

| | | | | |
|---|---|---|---|---|
| 5,642,263 A * | 6/1997 | Lauruhn | ...................... | 361/801 |
| 6,483,717 B1 * | 11/2002 | Ives et al. | ...................... | 361/801 |
| 6,738,261 B2 * | 5/2004 | Vier et al. | ...................... | 361/740 |
| 6,850,415 B2 * | 2/2005 | Dimarco | ...................... | 361/752 |
| 7,414,860 B1 * | 8/2008 | Chen | ............................ | 361/801 |
| 7,613,006 B2 * | 11/2009 | Kuo | .............................. | 361/756 |
| 8,335,088 B2 * | 12/2012 | Pirillis | ........................ | 361/801 |
| 2003/0156399 A1 * | 8/2003 | Cerniglia et al. | ............ | 361/802 |
| 2009/0255099 A1 * | 10/2009 | Zhang et al. | ................. | 24/572.1 |
| 2012/0194350 A1 * | 8/2012 | Crisp et al. | ............... | 340/815.42 |

\* cited by examiner

*Primary Examiner* — Forrest M Phillips
(74) *Attorney, Agent, or Firm* — Novak Druce Connolly Bove + Quigg LLP

(57) ABSTRACT

An electronic device includes a chassis having a sidewall, a power supply detachably received in the chassis, a latching member, and a handle pivotably connected to the power supply. A first end of the latching member is fixed to the power supply, and a second end of the latching member detachably latches the handle. Two latching holes are defined in the sidewall of the chassis. The latching member includes two latching tabs engaging in the latching holes in response to the second end of the latching member latching the handle.

12 Claims, 7 Drawing Sheets

ELECTRONIC DEVICE WITH AN APPARATUS FOR FIXING A POWER SUPPLY

BACKGROUND

1. Technical Field

The present disclosure relates to an electronic device having an apparatus for fixing a power supply.

2. Description of Related Art

For an electronic device, such as a computer or a server, a power supply is usually fixed in a rack of the electronic device by a plurality of fasteners or screws. However, it is time-consuming and often difficult to assemble or disassemble the power supply to or from the electronic device.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
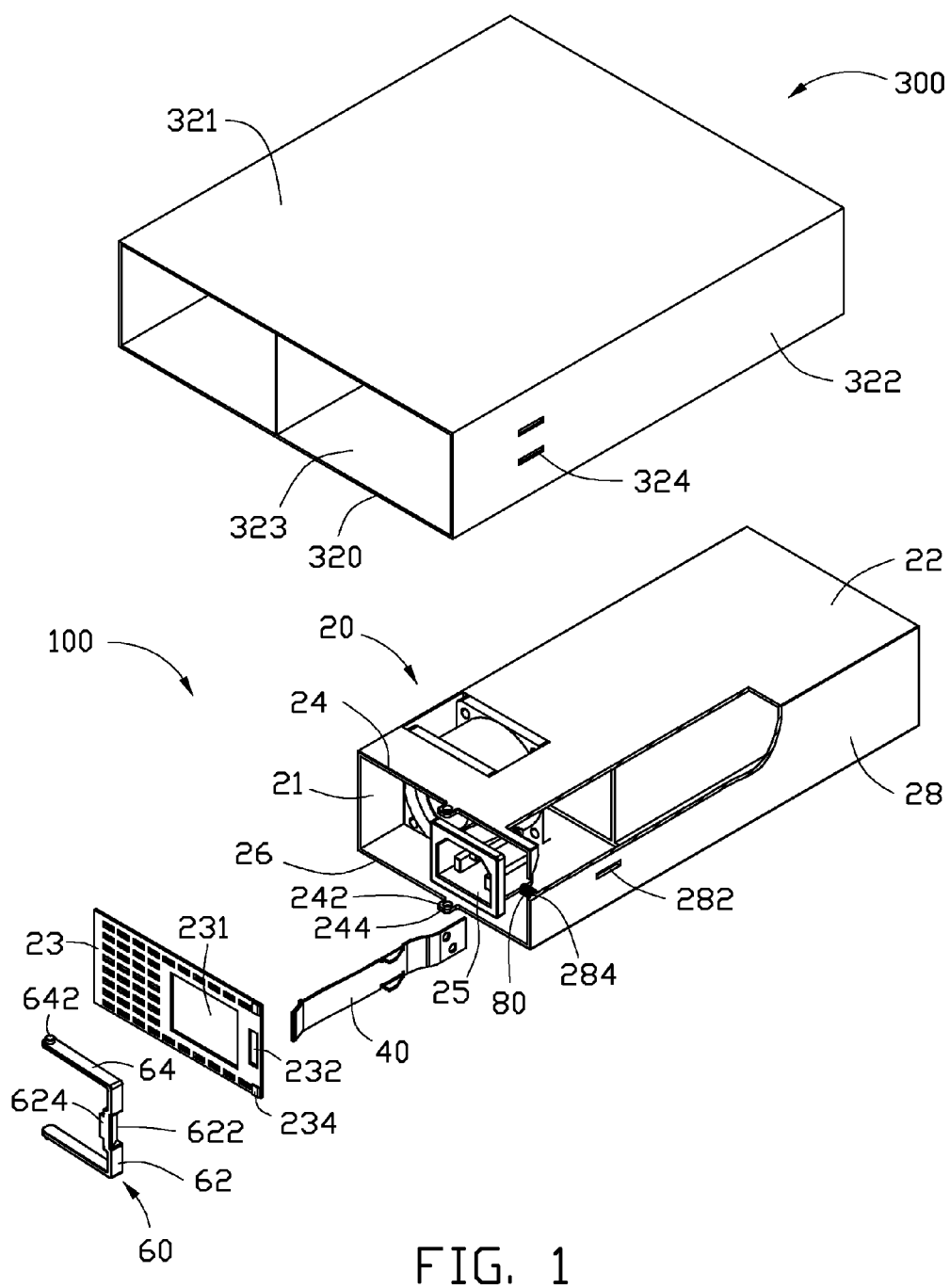
FIG. 1 is an exploded, isometric view of an exemplary embodiment of an electronic device, wherein the electronic device includes a power supply a handle, and a latching member.

Referring to FIG. 1, an exemplary embodiment of an electronic device includes a chassis 300, a power supply 100, a latching member 40, a handle 60, and a resilient member 80. A plurality of electronic elements (not shown), such as a motherboard and a hard disk drive, can be mounted in the chassis 300 to execute function of a computer or a server. The chassis 300 includes a bottom wall 320, two sidewalls 322 extending up from opposite sides of the bottom wall 320, and a top wall 321 connected between tops of the sidewalls 322 and opposite to the bottom wall 320. The bottom wall 320, the sidewalls 322, and the top wall 321 cooperatively define a receiving space 323 for receiving the power supply 100 and the electronic elements. Two latching holes 324 are defined in a rear end of one of the sidewalls 322, communicating with the receiving space 323.

The power supply 100 includes a main body 20 and a cover 23. The main body 20 includes a rectangular frame 22 and a connector 25 formed at an end of the frame 22. The frame 22 includes a top plate 24, a bottom plate 26, and two opposite side plates 28 perpendicularly connected between sides of the top plate 24 and the bottom plate 26. Rear ends of the top plate 24, the bottom plate 26, and the side plates 28 cooperatively define an opening 21. The connector 25 is exposed through the opening 21. Two opposite tabs 242 respectively extend rearward from the rear ends of the top plate 24 and the bottom plate 26. Each tab 242 defines a shaft hole 244. One of the side plates 28 defines two through holes 282. A fixing pole 284 from the side plate 28, adjacent to the opening 21, fixes to the resilient member 80. The cover 23 defines an opening 231 therein, corresponding to the connector 25. A through hole 232 is defined in an end of the cover 23. Two resilient pieces 234 extend rearward from the cover 23, respectively above and below the through hole 232.

Figure 2:
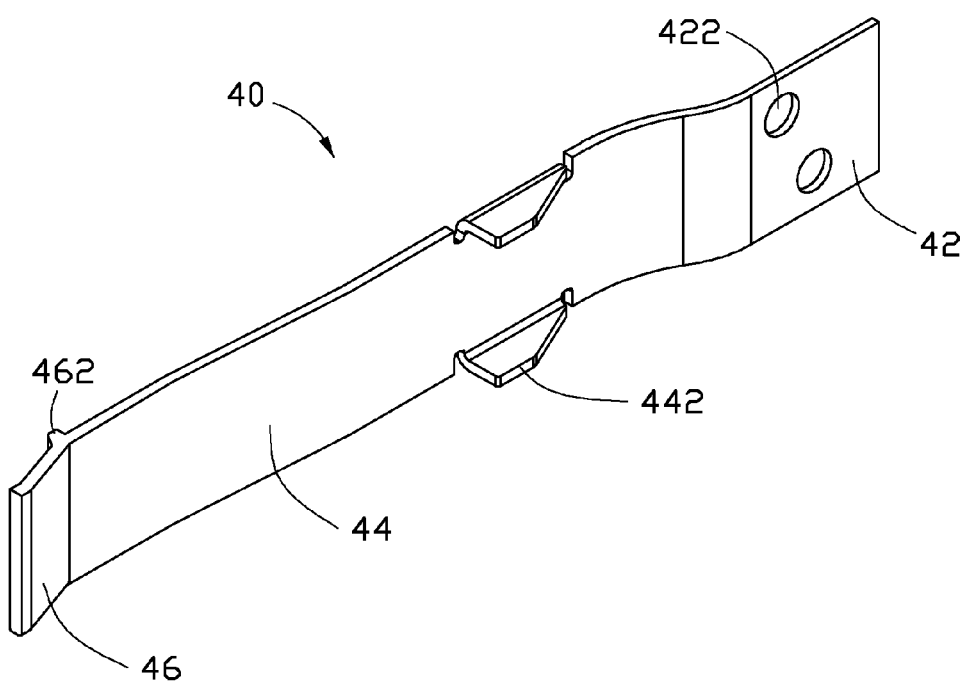
FIG. 2 is an enlarged, isometric view of the latching member of FIG. 1.

Referring to FIG. 2, the latching member 40 is substantially bar-shaped, and includes a resilient connecting plate 44, a locating plate 42 slantingly extending out from a first end of the connecting plate 44, and a guiding plate 46 slantingly extending out from a second end of the connecting plate 44. The locating plate 42 defines two fixing holes 422. Two wedge-shaped latching tabs 442 extend out from opposite sides of the connecting plate 44, adjacent to the locating plate 42. A bar-shaped protrusion 462 protrudes in from a junction of the connecting plate 44 and the guiding plate 46. In the embodiment, the latching member 40 is made of resilient material, such as plastic or steel, and is integrally formed.

The handle 60 is substantially U-shaped, and includes two parallel pivoting arms 64, and a latching portion 62 perpendicularly connected between first ends of the pivoting arms 64. A pin 642 extends out from a second end of each pivoting arm 64 opposite to the latching portion 62. A guiding slot 622 is defined in a middle of an outer surface of the latching portion 62 opposite to the pivoting arms 64. An operation portion 624 extends away from the latching portion 62 opposite to the guiding slot 622.

In the embodiment, the resilient member 80 is a spring.

Figure 3:
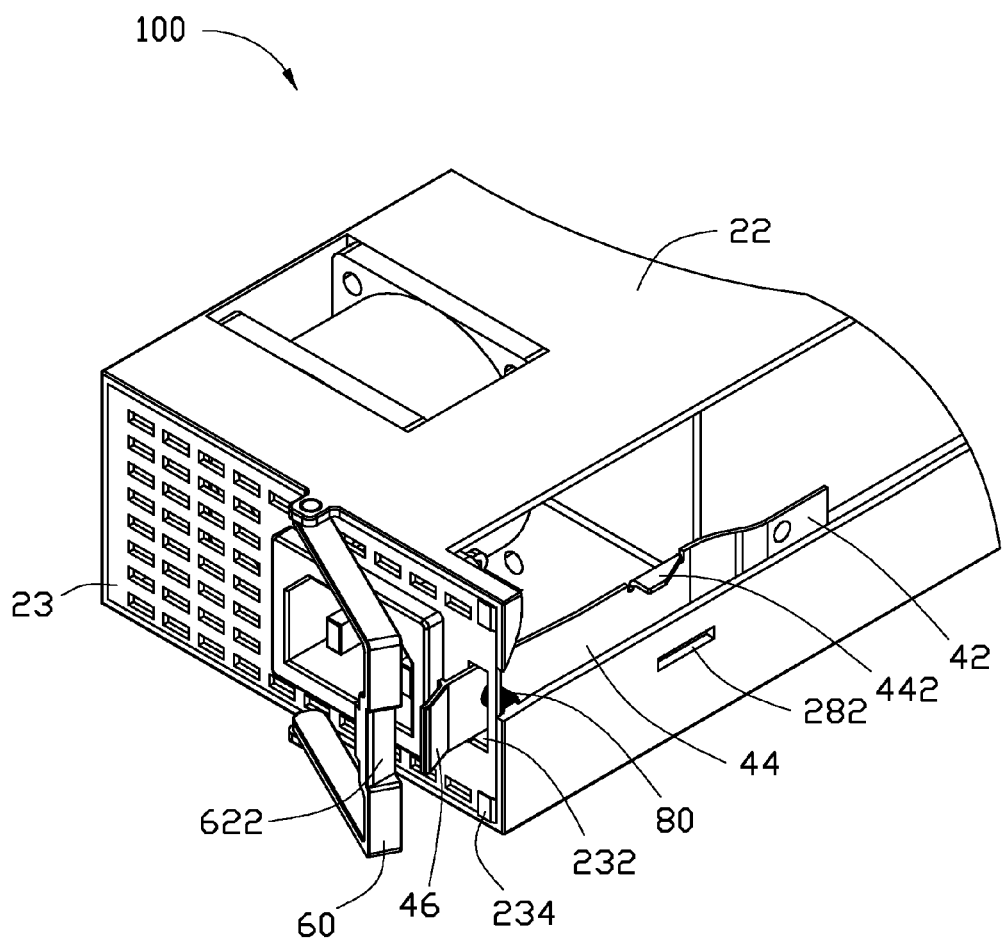
FIG. 3 is an assembled, isometric view of the power supply, the handle, and the latching member of FIG. 1.
Figure 4:
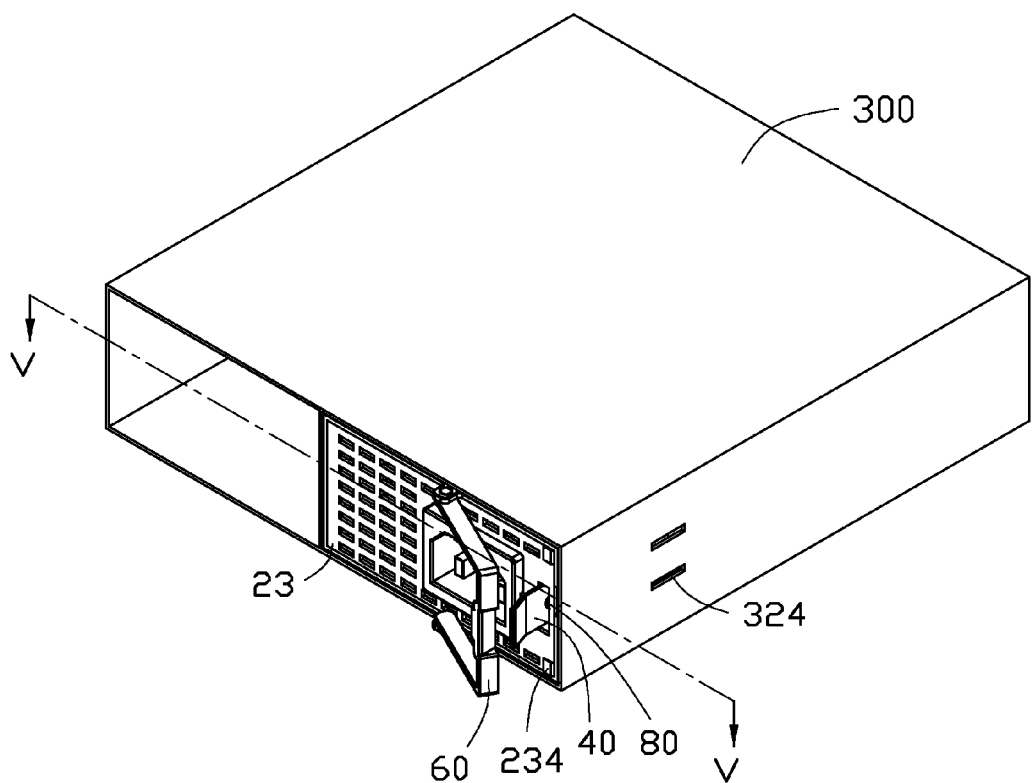
FIG. 4 is an assembled, isometric view of the electronic device of FIG. 1.
Figure 5:
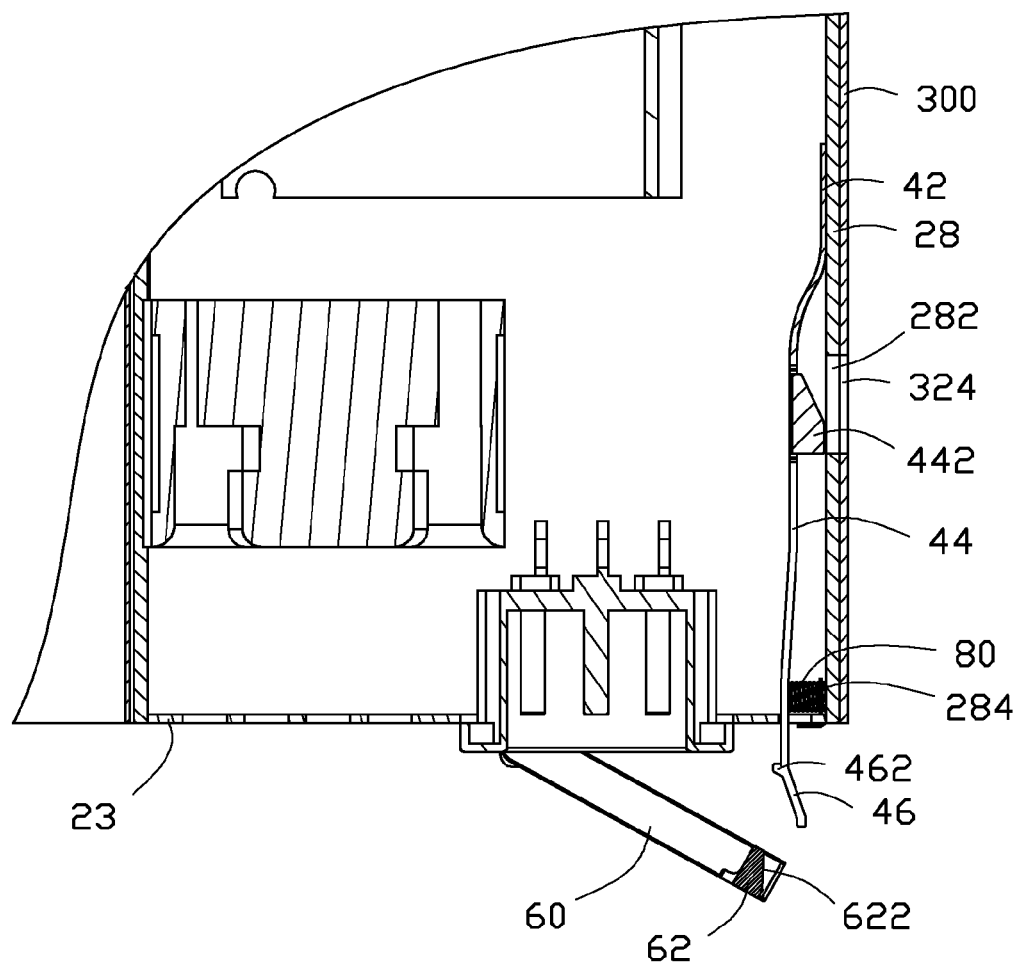
FIG. 5 is a cross-sectional view of FIG. 4, taken along the line of V-V.
Figure 6:
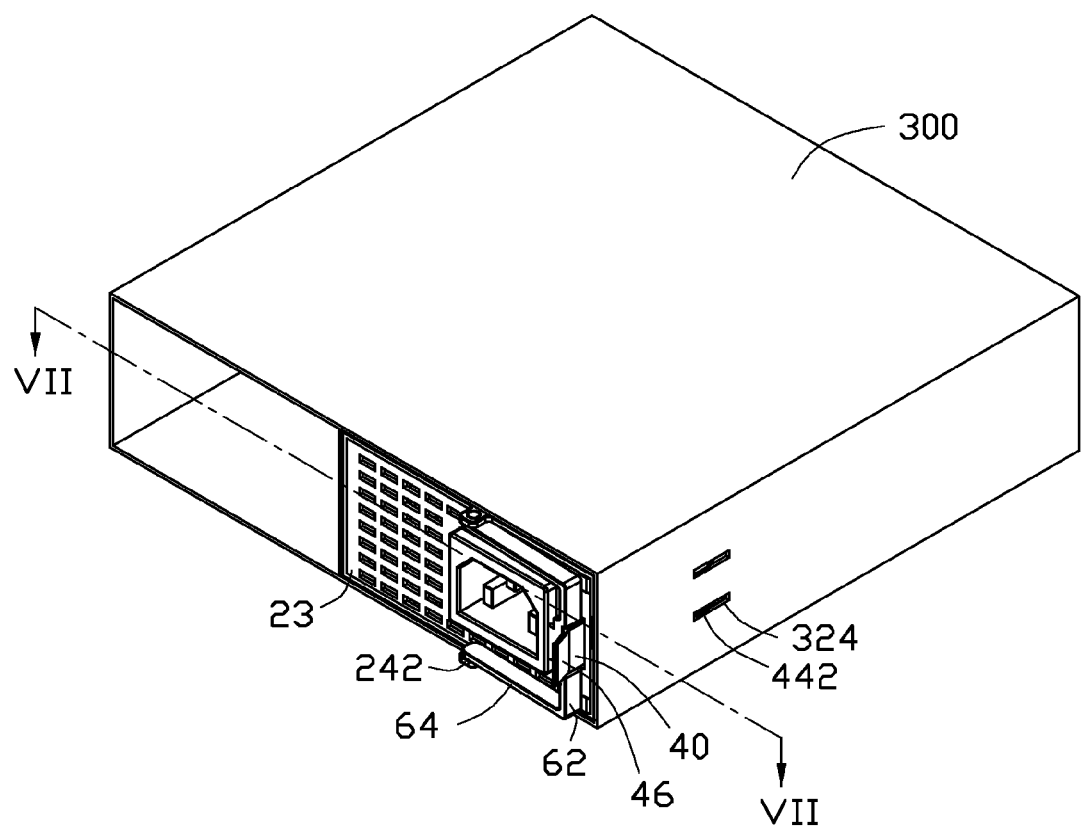
FIG. 6 is similar to FIG. 4, but shows a different state of use.
Figure 7:
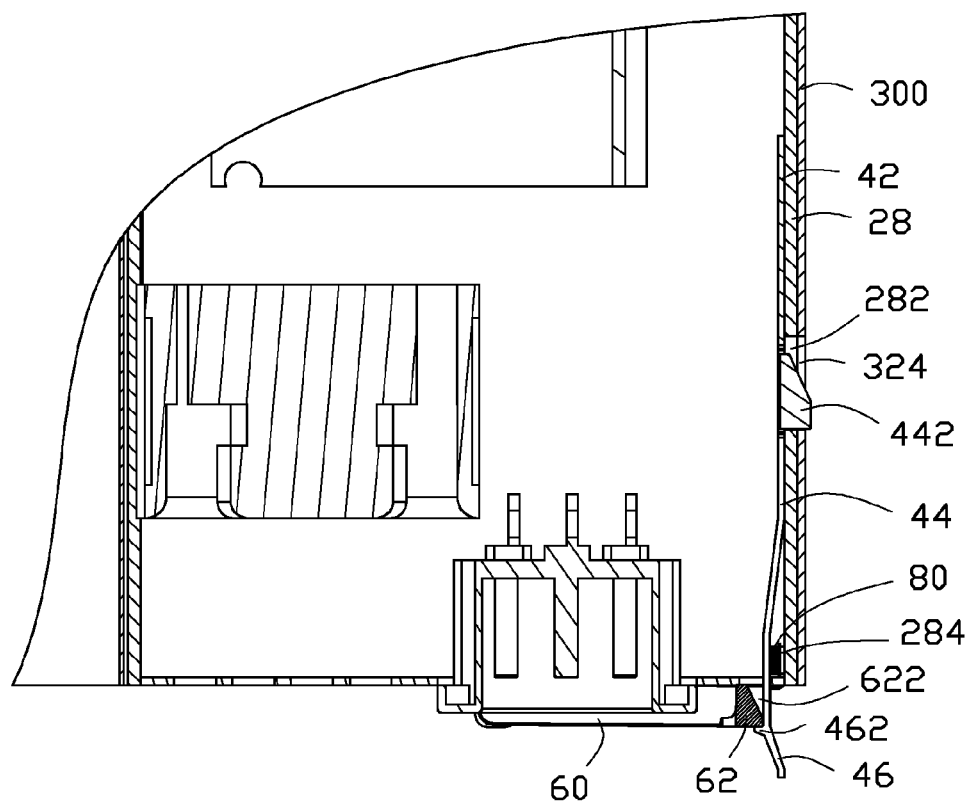
FIG. 7 is a cross-sectional view of FIG. 6, taken along the line of VII-VII.

Referring to FIG. 3, in assembly of the power supply 100, the latching member 40, and the handle 60, a first end of the resilient member 80 is fitted about the pole 284 of the frame 22. Two rivets respectively extend through the fixing holes 422 of the latching member 40, to be riveted to an outer surface of the side plate 28 defining the through holes 282, thereby fixing the latching member 40 to an inner surface of the side plate 28. A second end of the resilient member 80 resiliently abuts against the connecting plate 44. The latching tabs 442 align with the corresponding through holes 282. The protrusion 462 and the guiding plate 46 extend out of the frame 22 through the opening 21. The cover 23 is attached to the main body 20 to cover the opening 21. The resilient pieces 234 are exposed through the opening 21. The guiding plate 46 and the protrusion 462 extend out through the through hole 232 of the cover 23. The connector 25 is exposed through the opening 231. The pins 642 of the handle 60 are rotatably inserted into the corresponding shaft holes 244. The resilient member 80 biases the connecting plate 44 to abut a sidewall bounding the through hole 232 and adjacent to the connector 25.

Referring to FIGS. 4-7, in assembling the power supply 100 to the chassis 300, the front end of the frame 22 is inserted into the receiving space 323 from the rear end of the chassis 300. The power supply 100 is pushed forward, until the through holes 282 align with the corresponding latching holes 324. The operation portion 624 is operated to rotate the handle 60 toward the guiding plate 46 of the latching member 40, until the guiding plate 46 is accommodated in the guiding slot 622. The handle 60 is rotated further, the bottom wall bounding the guiding slot 622 slidably abuts against the guiding plate 46. The connecting plate 44 and the resilient member 80 are deformed toward the sidewall 324 defining the latching holes 324. The latching tabs 442 are extended through the through holes 282 to engage in the corresponding latching holes 324. After the protrusion 462 passes over the latching portion 62, the resilient member 80 and the connecting plate 44 are restored slightly to allow the protrusion 462 latch the latching portion 62. The handle 60 abuts against the resilient pieces 234 to deform the resilient pieces 234. The latching portion 62 is resiliently sandwiched between the resilient pieces 234 and the protrusion 462 of the latching member 40.

In disassembling the power supply 100 from the chassis 300, the guiding plate 46 of the latching member 40 is pressed away from the handle 60, deforming the connecting plate 44 and the resilient member 80, until the protrusion 462 is disengaged from the latching portion 62 of the handle 60. The resilient pieces 234 are restored to urge the handle 60 to rotate away from the latching member 40. The connecting plate 44 and the resilient member 80 are restored toward the connector 25. The latching pieces 442 are disengaged from the latching holes 324. The power supply 100 is ready to be removed from the chassis 300 through pulling the handle 60.

It is to be understood, however, that even though numerous characteristics and advantages of the embodiments have been set forth in the foregoing description, together with details of the structure and function of the embodiments, the present disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. An electronic device comprising:
    a chassis comprising a sidewall defining a latching hole;
    a power supply detachably received in the chassis;
    a latching member comprising a latching tab aligning with the latching hole; and
    a handle pivotably connected to the power supply, wherein a first end of the latching member is fixed to the power supply, a second end of the latching member detachably latches the handle, and wherein in response to the second end of the latching member latching the handle, the latching tab engages in the latching hole;
    wherein the power supply comprises a frame and a cover, the cover defines a first through hole, the latching member comprises a resilient connecting plate, a locating plate extending forward from a front end of the connecting plate, and a guiding plate extending rearward from a rear end of the connecting plate, the latching tab extends out from the connecting plate adjacent to the locating plate, the locating plate is fixed on an inner surface of the frame, a protrusion protrudes from a junction of the connecting plate and the guiding plate, the handle defines a guiding slot, and the guiding plate extends through the first through hole, to allow the protrusion detachably latch the handle along the guiding slot.

2. The electronic device of claim 1, wherein two resilient pieces extend rearward from the cover, respectively above and below the first through hole for resisting against the handle.

3. The electronic device of claim 1, wherein the frame is substantially rectangular, and comprises a top plate, a bottom plate, and two side plates connected between corresponding sides of the top plate and bottom plate, the locating plate is fixed on one of the side plates, a second through hole is defined in the side plate, and the latching tab extends through the second through hole to engage in the latching hole of the chassis.

4. The electronic device of claim 3, wherein the handle comprises two parallel pivoting arms, and a latching portion connected between first ends of the pivoting arms, two opposite tabs respectively extend rearward from rear sides of the top plate and the bottom plate, second ends of the pivoting arms are pivotably connected to the corresponding tabs, and the protrusion detachably latches onto the latching portion of the handle.

5. The electronic device of claim 4, wherein a shaft hole is defined in each tab, a pin extends out from the second end of each pivoting arm and pivotably engages in the corresponding shaft hole.

6. The electronic device of claim 4, wherein the guiding slot is defined in an outer surface of the latching portion opposite to the pivoting arms.

7. The electronic device of claim 6, wherein an operation portion extends in from the latching portion opposite to the guiding slot to engage with the latching member.

8. The electronic device of claim 1, further comprising a resilient member, wherein a first end of the resilient member is attached to the inner surface of the frame, a second end of the resilient member resiliently abuts against the connecting plate, to bias the second end of the connecting plate away from the frame, and bias the latching tab to disengage from the latching hole of the chassis.

9. The electronic device of claim 1, wherein the latching member is made of resilient material, and is integrally formed.

10. An electronic device comprising:
    a chassis comprising a sidewall defining two latching holes;
    a power supply detachably received in the chassis;
    a latching member comprising two latching tabs aligning with the latching holes; and
    a handle pivotably connected to the power supply, wherein a first end of the latching member is fixed to the power supply, a second end of the latching member detachably latches the handle, and wherein in response to the second end of the latching member latching the handle, the latching tabs engages in the corresponding latching holes;
    wherein the power supply comprises a frame and a cover, the cover defines a first through hole, the latching member comprises a resilient connecting plate, a locating plate extending forward from a front end of the connecting plate, and a guiding plate extending rearward from a rear end of the connecting plate, the latching tabs extends out from two opposite sides of the connecting plate adjacent to the locating plate, the locating plate is fixed on an inner surface of the frame, a protrusion protrudes from a junction of the connecting plate and the guiding plate, the handle defines a guiding slot, and the guiding plate extends through the first through hole detachably latching the handle along the guiding slot.

11. The electronic device of claim 10, wherein the frame is substantially rectangular, and comprises a top plate, a bottom plate, and two side plates connected between corresponding sides of the top plate and bottom plate, the locating plate is fixed on one of the side plates, two second through holes are defined in the side plate, and the latching tabs extend through the second through holes to engage in the corresponding latching holes of the chassis.

12. The electronic device of claim 11, wherein the handle comprises two parallel pivoting arms, and a latching portion connected between first ends of the pivoting arms, two opposite tabs respectively extend rearward from rear sides of the top plate and the bottom plate, second ends of the pivoting arms are pivotably connected to the corresponding tabs.

* * * * *